US010507624B2

(12) United States Patent
Geltinger et al.

(10) Patent No.: US 10,507,624 B2
(45) Date of Patent: Dec. 17, 2019

(54) BLOW MOULDING MACHINE WITH AUTOMATICALLY ACTUATED BASE COUPLING

(71) Applicant: KRONES AG, Neutraubling (DE)

(72) Inventors: Florian Geltinger, Donaustauf (DE); Gerhard Schwoed, Alteglofsheim (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 15/959,015

(22) Filed: Apr. 20, 2018

(65) Prior Publication Data

US 2018/0244005 A1    Aug. 30, 2018

Related U.S. Application Data

(62) Division of application No. 14/696,139, filed on Apr. 24, 2015, now Pat. No. 9,975,303.

(30) Foreign Application Priority Data

Apr. 24, 2014  (DE) ........................ 10 2014 105 762

(51) Int. Cl.
*B29C 49/48*  (2006.01)
*B29D 22/00*  (2006.01)
*B29L 31/00*  (2006.01)

(52) U.S. Cl.
CPC ............ *B29D 22/003* (2013.01); *B29C 49/48* (2013.01); *B29C 2049/483* (2013.01);
(Continued)

(58) Field of Classification Search
CPC ................ B29C 2049/4858; B29C 2049/4864
See application file for complete search history.

(56) References Cited

U.S. PATENT DOCUMENTS 8,069,545 B2   12/2011  Stoiber ................ B29C 33/306
9,186,841 B2   11/2015  Zoppas .................. B29C 49/48
(Continued)

FOREIGN PATENT DOCUMENTS

CN       101479094       7/2009    ............ B29C 49/42
DE    10 2009 035 871    2/2011    ............ B29C 49/28
(Continued)

OTHER PUBLICATIONS

Chinese Office Action issued in application No. 201510197280.4, dated Mar. 1, 2017 (18 pgs).
Extended European Search Report (no translation) issued in application No. 15165096.7, dated Sep. 22, 2015 (4 pgs).
Notice of Allowance issued in U.S. Appl. No. 14/696,139, dated Jan. 25, 2018 (5 pgs).
(Continued)

*Primary Examiner* — Robert B Davis
(74) *Attorney, Agent, or Firm* — Hayes Soloway P.C.

(57) ABSTRACT

Apparatus for transforming plastic parisons into plastic containers includes a transforming station having a blow mould within which plastic parisons can be expanded by application of a gaseous medium. The blow mould has a base part arranged releasably on a support. The transforming station has at least one first connector for supplying a flowable temperature control medium to the transforming station, and this supply of the temperature control medium can be disconnected via the connector. The fastening mechanism has a release element which is movable in a predetermined straight direction. By displacement of this release element into a first predetermined position fastening of the base part on the support is releasable and by a displacement of this release element into a second predetermined position the base part can be fastened on the support.

25 Claims, 5 Drawing Sheets

(52) U.S. Cl.
CPC ............... *B29C 2049/4828* (2013.01); *B29C 2049/4843* (2013.01); *B29C 2049/4848* (2013.01); *B29C 2049/4858* (2013.01); *B29C 2049/4892* (2013.01); *B29L 2031/7158* (2013.01)

(56) References Cited

U.S. PATENT DOCUMENTS

| | | | |
|---|---|---|---|
| 9,975,303 B2 * | 5/2018 | Geltinger | B29D 22/003 |
| 2004/0052892 A1 | 3/2004 | Linke et al. | 425/542 |
| 2009/0178264 A1 * | 7/2009 | Stoiber | B29C 33/306 29/401.1 |
| 2011/0027409 A1 | 2/2011 | Stoiber et al. | 425/526 |
| 2011/0049742 A1 | 3/2011 | Senn | B29C 49/48 |
| 2011/0223275 A1 | 9/2011 | Dagorn et al. | 425/161 |
| 2012/0091631 A1 | 4/2012 | Blochmann et al. | 264/402 |
| 2014/0284916 A1 | 9/2014 | Cirette et al. | 285/82 |

FOREIGN PATENT DOCUMENTS

| | | | |
|---|---|---|---|
| DE | 102009054385 | 7/2011 | ............ B29C 33/04 |
| DE | 10 2010 048 720 | 4/2012 | ............ B29C 49/28 |
| EP | 1 299 223 | 4/2003 | ............ B29C 49/54 |
| WO | WO 2013/083523 | 6/2013 | ............ B29C 33/04 |

OTHER PUBLICATIONS

Office Action issued in U.S. Appl. No. 14/696,139, dated Apr. 5, 2017 (11 pgs).
Office Action issued in U.S. Appl. No. 14/696,139, dated Oct. 12, 2017 (8 pgs).
Partial machine translation of DE 102009054385 A1 dated Jul. 2011 obtained from the espace website.
Search Report issued in corresponding German Patent Appln. No. 10 2014 105 762.7 dated Apr. 23, 2015 (5 pgs).

* cited by examiner

BLOW MOULDING MACHINE WITH AUTOMATICALLY ACTUATED BASE COUPLING

CROSS REFERENCE TO RELATED APPLICATION

This application is a divisional of co-pending U.S. application Ser. No. 14/696,139, filed Apr. 24, 2015, which claims priority from German Patent Application Serial No. 10 2014 105 762.7, filed Apr. 24, 2014, the contents of which are incorporated herein by reference.

BACKGROUND OF THE INVENTION

The present invention relates to an apparatus and a method for transforming plastic parisons into plastic containers. Such apparatus and methods have been known for a long time from the prior art.

In this case plastic parisons which have been heated in the usual way are delivered to a blow moulding device, such as in particular a stretch blow moulding machine, and can be expanded thereby to form plastic containers.

These blow moulding machines usually have a plurality of blow stations which in turn are equipped with blow moulds, in the interior of which the plastic parisons are transformed by the application of compressed air to form the plastic containers and in particular plastic bottles. However, when such devices are in operation it is often necessary to replace the blow moulding devices. This may be necessary for example if it is intended to change over from a specific container type to another container type or container shape.

In this case in the prior art this changeover is a relatively complex process, since the blow moulds must be replaced at each of the individual transforming stations. In the prior art this takes place in the usual way using tools, such as for example screwdrivers and the like.

DE 10 2010 048 720 A1 describes a base mould which can be quickly assembled with the additional assistance of a holding force. In this case release of the base part of the blow mould from a support can be achieved here by means of a rotary movement of a locking element.

EP 1 299 223 B1 describes an apparatus for blow moulding containers. In this apparatus a manual lever is used to release the base part. However, automated release of the base part is hindered by this manual lever.

In some blow moulding devices it is necessary or advantageous within the context of the production process for the walls thereof to be temperature-controlled, for example cooled. For this purpose the corresponding blow moulding devices or the side parts thereof or the base parts thereof have temperature control channels within which a temperature control medium can flow. These temperature control channels are connected to a coolant supply, for example to a water supply, and thus in working operation the temperature control can be achieved or maintained.

The object of the present invention therefore is to provide an apparatus and a method which should enable a comparatively quick changing operation of the blow moulding device and preferably also at least partially automatic changing of blow mould parts.

SUMMARY OF THE INVENTION

An apparatus according to the invention for transforming plastic parisons into plastic containers has at least one transforming station which in turn has a blow mould within which the plastic parisons can be expanded by application of a gaseous medium. In this case the blow mould has a base part which is arranged releasably (and at least indirectly) on a support. Furthermore the apparatus has a fastening mechanism in order to fasten the blow mould and in particular the base part to this support.

Furthermore the apparatus, in particular the transforming station, has at least one first connector in order to supply a flowable temperature control medium to the apparatus, in particular to the transforming station and in particular also to the base part, wherein this supply of the temperature control medium via the connector (in particular by means of a flow passing through the connector) can be disconnected or interrupted by removal or a removal movement of the base part from the support.

According to the invention this fastening mechanism has a release element which is movable in a predetermined straight direction, wherein by a displacement of this release element into a first predetermined position the fastening of the base part on the support is releasable and by a displacement of this release element into a second predetermined position the base part can be fastened on the support.

It is therefore proposed that the fastening of the base part or release of this fastening is achieved by a movement of this said release element in a straight line. This said movement in a straight line can be achieved in a relatively simple manner for instance by pneumatic means. In this way automatic removal of the base part from the blow mould can be achieved. Advantageously the release element is an actuating element which at least indirectly effects locking of the fastening or release of this locking. In this case it is possible for this release element or actuating element in turn to actuate or move a further element and by this actuation to achieve the locking or release of the locking. Therefore the actuating element can preferably be moved in a first direction for locking and in a second direction which is opposed to the first direction for release of the locking.

As mentioned above, in the manufacture of the containers it is sometimes necessary for the respective blow moulds or also the base parts to be temperature-controlled and in particular cooled. This purpose is served by the connector described here, by means of which ultimately the base part can be connected to a supply of temperature control medium and in particular to a water supply. Thus by removal of the base part from the support the supply of temperature control medium can also be interrupted (in particular substantially simultaneously).

A further apparatus according to the invention for transforming plastic parisons into plastic containers has at least one transforming station having a blow mould within which the plastic parisons can be expanded by application of a gaseous medium, wherein the blow mould has at least one side part which is arranged releasably on a support, and a fastening mechanism in order to fasten the side part to the support.

According to the invention this fastening mechanism has a release element which is movable in a predetermined straight direction, and by a displacement of this release element into a first predetermined position the fastening of the side part on the support is releasable and by a displacement of this release element into a second predetermined position the side part can be fastened on the support.

Thus within the scope of the invention the same mechanism is proposed for the fastening of the side part or the side parts as for the base part. The fastening mechanism of the base part is described in the context of the following description of the drawings set out below. A corresponding fastening mechanism is also used for fastening the side parts. However, in the installed state this fastening mechanism is rotated substantially by 90° relative to the fastening mechanism of the base part. Two such fastening mechanisms are preferably provided for holding the side parts (one fastening mechanism per side part).

The fastening mechanism described here offers the advantage that it enables automatic release and/or fastening of the side part or base part from or on the support. The support of the side part is preferably a so-called blow mould support shell. When the side part is replaced this blow mould support shell can remain fastened on a blow mould support and the side part is released from the blow mould support shell. Thus this fastening mechanism is preferably constructed between the blow mould support shell and the side part.

However, it would also be conceivable for this fastening mechanism to be constructed between the blow mould support and the blow mould support shell or between the blow mould support and the side part. The side part is preferably arranged directly on the blow mould support shell.

Furthermore in this case the transforming station has at least one first connector in order to supply a flowable temperature control medium to the transforming station and in particular to the side part, and this supply of the temperature control medium can be disconnected via the connector by removal of the side part from the support. It is therefore also proposed that the side part has temperature control channels through which a temperature control medium can flow in order thus to control the temperature of this side part, for instance to cool it.

The design of this temperature control and also of the fastening mechanism is described below predominantly with reference to the base part. However, it is pointed out that these designs are correspondingly also applicable to the fastening of the side part.

In an advantageous embodiment the base part is arranged by means of at least one intermediate support on the said support. In this case it is possible that the intermediate support is arranged on the base part and this intermediate support also functions for example as a spacer. A fastening part can also preferably be disposed on this intermediate support, but optionally also on the base part itself, and in turn a part of the fastening mechanism can be arranged on this fastening part.

In a further advantageous embodiment, as set out above, the apparatus or the transforming station also has two side parts which, preferably together with the base part, delimit the cavity within which the plastic parisons are transformed into the plastic containers.

Advantageously the above-mentioned side parts of the blow moulding device are also in each case arranged on a blow mould support. In this case the side parts are preferably arranged on blow mould support shells and these blow mould support shells are in turn arranged on blow mould supports. Advantageously the blow mould supports on which the side parts are arranged can swivel about a swivel axis, in particular a common swivel axis in order in this way to open and close the blow moulding device. In this case this swivel axis advantageously extends parallel to the longitudinal direction of a plastic parison or also of a plastic container to be produced therefrom.

Furthermore the apparatus advantageously has an application device in order to apply a flowable and in particular a gaseous medium (in particular with compressed air) to the plastic parisons. This application device is advantageously a blowing nozzle which can be applied to the plastic parison in order to expand it. Advantageously in this case the application device can be delivered to the plastic parison by means of a driving device. In a further advantageous embodiment the apparatus also has a rod-like element which can be introduced into the interior of the plastic parisons in order to expand these containers in their longitudinal direction. Thus the apparatus preferably has a so-called stretching rod, and the apparatus is advantageously a stretch blow moulding machine.

In a further advantageous embodiment the side parts can also engage in regions of the base part in order to close the blow mould. In a further advantageous embodiment the apparatus has a plurality of transforming stations which particularly preferably are arranged on a common support. This support is in particular a rotatable support, such as a so-called blow wheel.

Advantageously at least one space to which a gaseous medium can be applied is constructed between the blow mould support parts and the blow mould parts or side parts. In this way in particular a pressure pad can be constructed by means of which a blow mould part can be delivered to the other blow mould part during the expansion process. Thus advantageously at least one blow mould part has, relative to the blow mould part on which it is arranged, a certain mechanical play in a direction perpendicular to a plane which in a closed state of the blow mould is defined between the two blow mould parts.

In a further advantageous embodiment the above-mentioned release element can be actuated or moved automatically. Advantageously this release element can be actuated by a flow medium, that is to say it can be actuated in particular hydraulically or pneumatically. However, it would also be conceivable for the release element to be actuated by a magnetic force. Thus it would be conceivable to provide a robot device which automatically carries out such a change of the base part and/or the side part. For this purpose first of all the fastening mechanism could be released and then the relevant side part could be removed. Advantageously the release element is not accessible for a user or operator without the fastening mechanism being released and the blow mould part being removed for this purpose, for example in that it is arranged inside the aforementioned support.

The apparatus according to the invention preferably has the described fastening mechanisms both for the side part or the side parts of the blow moulding device and also for the base part. Thus it would be possible for the fastenings of the side parts and also of the base part to be released or established automatically. Furthermore it would be conceivable that, in particular after release of the respective fastening mechanisms, the blow moulding device in its entirety is removed from the transforming station. In this case it would in particular be conceivable that further locking mechanisms are provided which fasten the side parts and the base part of the blow mould to one another, in particular for an installation operation and a removal operation, so that the blow moulding device can be installed or removed in an assembled state.

Furthermore for example the support can have a contact surface which in an installed state rests on a fastening element fastened at least indirectly on the base part (or the side part) (or a corresponding contact surface of this fastening element) and a first component of the fastening device can be arranged within this contact surface. In a locked state of the base part or of the side part on the support, the fastening device is preferably completely surrounded in the peripheral direction by regions or material of the support. The release element advantageously has a circular cross-section.

In a further advantageous embodiment the apparatus has a guiding device which guides the release element. In this case for example a sleeve body can be provided, within which the release element is movably mounted. Conversely, however, the guide element can also (preferably) be constructed as a rod-like body which in turn engages in the release element and thus effects guiding of the release element.

The release element (which serves for fastening of the base part) can advantageously be actuated in the longitudinal direction of the plastic parisons to be expanded. Advantageously this relates to the same direction in which the above-mentioned stretching rod is also introduced into the interior of the plastic parisons. The release element (which serves for fastening of the side part) can advantageously be actuated essentially perpendicular to the longitudinal direction of the plastic parisons to be expanded. In the case of fastening of the side parts the release element is preferably disposed displaceably on the blow mould support shell.

Advantageously, by removal of the base part or of the side part from the respective support (in particular from the blow mould support shell in the case of the side part) this connection for the temperature control medium or the cooling agent can also be broken. Preferably, in the same working step, although not necessarily simultaneously, not only can the base part or the side part be released from the support but also the supply of the temperature control medium can be interrupted. Thus it is preferably possible that for example the base part—optionally together with an intermediate support arranged on the base part and/or a fastening element—is lifted off from the support and thus separated and by the same operation the connection(s) for the temperature control medium is/are interrupted. The connections for the temperature control medium can preferably be produced by an approaching movement of the base part towards the support.

In a further advantageous embodiment the base part or the side part can be removed after release of the fastening mechanism by a movement in a straight direction. Advantageously in the case of the base part or the side part this is the same direction in which the release element is also movable. In the case of the base part this may be a direction which is parallel to the longitudinal direction of the plastic parisons, namely in the case of the side part a direction which is substantially perpendicular to the longitudinal direction of the plastic parisons. Movable elements of the respective fastening mechanisms such as in particular the release element and/or the locking element are preferably arranged on the respective supports. This has the advantage that these elements remain on the machine when the blow moulding devices are replaced.

In a further advantageous embodiment the first connector has a first connecting element as well as a second connecting element, which can be coupled to one another by a relative movement of one connecting element relative to the other connecting element in a straight direction, in order to supply the flowable temperature control medium to the transforming station and in particular the base part or the side part of the blow moulding device. Therefore due to this coupling and/or uncoupling facility of the connectors it is possible that by the same movement, namely a removal movement of the blow mould from the support, the connections are also broken and conversely in the event of delivery of the blow mould part to the support the connectors or the connecting elements thereof are connected to one another.

Advantageously at least one connecting element, and in particular a connecting element which is arranged at least indirectly on the blow mould part, has a valve device which closes when the connecting elements are separated, so that after the separation operation no temperature control medium can flow out of the base part.

In other words, by a relative movement of the connecting elements with respect to one another a fluid communication between a supply of temperature control medium and the base part or the side parts can be produced or also interrupted.

In a further advantageous embodiment the mentioned straight direction also corresponds to the direction of removal of the base part or of the side part and/or the direction of movement of the release element.

In a further advantageous embodiment the release element has a rod-shaped body and/or a body which extends in the above-mentioned direction of movement of the release element.

Advantageously at least one connecting element also extends and particularly preferably both connecting elements extend in the above-mentioned direction in which the release element can also be moved. Thus if, as is frequently the case in the prior art, plastic parisons are introduced in an upright state into the blow mould, the mouth of each parison being oriented upwards, advantageously the connecting elements can also extend (in the case of the base part) in the longitudinal direction of the plastic parisons and (in the case of the side part or the side parts) substantially perpendicular to this longitudinal direction. The connecting elements are preferably designed as plug and coupling.

In this way changing of the base part and/or of the side part can be carried out automatically. Thus for example by means of a changing robot the base part can be gripped and, after release of the fastening mechanism, can be removed from the support. In the same working operation the temperature control medium connection can also be released. An automatic actuation of the release element, in particular in the context of a blow mould changing process, is made possible by the procedure described above. In this case, as mentioned above, the release element can be moved automatically.

In a further advantageous embodiment the apparatus has a second connector in order to draw off the temperature control medium from the base part. In this way the base part can be incorporated into a temperature control circuit. Advantageously this supply can be disconnected by removal of the base part. In this case it is also preferable here for the second connector to have two connecting elements which can be connected or disconnected to one another by a relative movement and in particular a relative movement in the direction described above. In this way it is also possible to incorporate the base part automatically into a temperature control circuit.

In a further advantageous embodiment the connectors and/or connecting elements are arranged offset with respect to one another in the above-mentioned direction, i.e. the direction in which the base part is removed from the support. In this way it is possible that when the base part is installed on the support first of all one connector and then the other is actuated or connected. In this way a chronologically staggered connection of the two connectors or of the respective connecting elements to a temperature control circuit is possible.

By a spring-loaded arrangement of one connecting element it can be provided that when the base part is delivered to the support first of all the respective connecting element is moved before it co-operates with the other connecting element or is connected thereto. Also by this spring-loaded arrangement of the connecting element this connecting element can be automatically restored to a predetermined starting position.

In a further advantageous embodiment the fastening mechanism has a locking element which is movable by a movement of the release element in the direction between at least two positions, wherein in one of these positions locking is established between the support and the base part or the side part and in the other position locking is released between the support and the base part or the support and the side part.

Thus it would be possible for example that the release element is moved in the longitudinal direction of the plastic parisons and in this way a transverse movement of the locking element is initiated. Preferably the release element has a widened portion, for example a conically extended portion or an inclined surface which is preferably in contact with the locking element. In this way by a movement of the release element in the direction described above a movement of the locking element in particular in a direction which is perpendicular hereto or oblique can be achieved.

By this movement of the locking element it is possible that as a consequence of a movement of the release element the locking element engages in a further element of the fastening device. Advantageously the locking element and particularly preferably the release element is also arranged on the support. A corresponding undercut or an engaging recess, in which the locking element can engage, is particularly preferably disposed at least indirectly on the base part, for example on the intermediate support or a fastening body firmly disposed on the intermediate support.

In a further advantageous embodiment the locking element is movable by the movement of the release element in a direction different from the direction of movement of the release element.

As mentioned, an inclined surface, i.e. an inclined surface with respect to the longitudinal direction, which forms a contact surface with the locking element, is preferably disposed on the release element.

In a further preferred embodiment it is also possible for a plurality of the described locking elements to be provided. In this case it is possible that by a movement of the release, element a plurality of locking elements are simultaneously moved and for example introduced into corresponding recesses in a retaining element.

Also the locking element could be an annular element which surrounds the release element and in particular the inclined surface of this release element in the peripheral direction thereof. The locking element is preferably movable in a radially extending direction with respect to the longitudinal direction of the release element. The locking element can preferably engage behind a portion of a further fastening element and in particular a fastening element arranged indirectly on the base part.

In a further advantageous embodiment the said fastening device is arranged at least in sections between the connectors. Thus for example it is possible that, relative to a longitudinal direction of the plastic parisons, the fastening device is arranged for example in a radially inner region of the support and a fastening element. In this way the fastening device is preferably always arranged inside the support and in particular is not accessible from the exterior.

In a further advantageous embodiment the fastening device has a receiving chamber which is suitable to receive a gaseous medium. A pneumatic medium, for example corn pressed air, can be applied to this receiving chamber in order thus to move the release element. Thus a piston arranged inside the said receiving chamber is arranged for example on the release element. Compressed air can be applied to this piston in order thus to move the release element. Furthermore it is possible to provide sealing elements in order to seal the piston relative to the receiving chamber.

In a further advantageous embodiment the fastening mechanism has a pretensioning device which pushes the release element in a predetermined direction. This is advantageously a direction which determines a locking position. This is advantageously a position in which the locking element is delivered in the direction of a recess in order thus to establish locking. In a further preferred embodiment, in a locked state of the base part this pretensioning device can also hold this base part on the support.

In a further advantageous embodiment the apparatus has a base part intermediate support on which is arranged a recess in which in turn at least parts of the fastening device are arranged.

In a further advantageous embodiment the fastening device has a receiving chamber to receive a pneumatic medium. If a pneumatic medium, in particular compressed air, is applied to this receiving chamber the release element can be moved in this way. However, it would also be conceivable for the release element to be moved using magnetic forces.

In a further advantageous embodiment at least the base part and/or at least one side part (and preferably both side parts) can be removed automatically from the respective support on which this base part or this side part is arranged. In terms of the method, the release of the base part or side part from the support and/or the fastening of the base part or side part on the support is preferably carried out automatically. For this purpose a robot device can for example grip the blow moulding device, the fastening mechanisms can be released and the blow moulding device can be removed from the transforming station. In this case the blow moulding device can preferably be removed in its entirety from the transforming station.

In a further preferred embodiment the actuation of the fastening mechanism for the base is coupled to the actuation of the fastening mechanism for at least one side part. In this case such a coupling can take place pneumatically, but it would also be conceivable for this coupling to take place hydraulically or by means of an (electronic) control. In this way it is possible in particular for all the fastening mechanisms to be automatically released substantially but not necessarily simultaneously, but in one working step (in order then to be able to remove the blow mould), or to be locked (in order thus to be able to dispose the blow mould on the transforming station).

The present invention further relates to a method for operating an apparatus for transforming plastic parisons into plastic containers, wherein in a working operation the plastic parisons are expanded by application of a flowable medium within a blow moulding device, and a flowable temperature control medium flows through at least one base part and/or at least one side part of this blow moulding device, wherein this temperature control medium is supplied to the base part and/or the side part by means of a connector, and the base part and/or the side part is fastened by means of a fastening mechanism on a support.

According to the invention this fastening mechanism has a release element which is movable in a predetermined straight direction, and by a displacement of this release element into a first predetermined position the fastening of the base part and/or the side part on the (respective) support is released and by a displacement of this release element into a second predetermined position the base part and/or the side part can be fastened on the (respective) support.

By removal of the base part and/or of the side part from the support the connector can preferably also be separated and thus particularly preferably a connection between the base part or the side part and a temperature control medium supply can be broken. Furthermore a temperature control medium supply can be produced by an approaching movement of the base part or the side part towards the support.

In a further advantageous method the temperature control medium is supplied to the base part by means of a first connector and drawn off from the base part by means of a second connector, and when the base part is installed on or removed from the support connecting elements of the first connector and connecting elements of the second connector are connected to one another or released from one another with a time delay.

Further advantages and embodiments are apparent from the appended drawings.

DETAILED DESCRIPTION OF THE INVENTION

Figure 1:
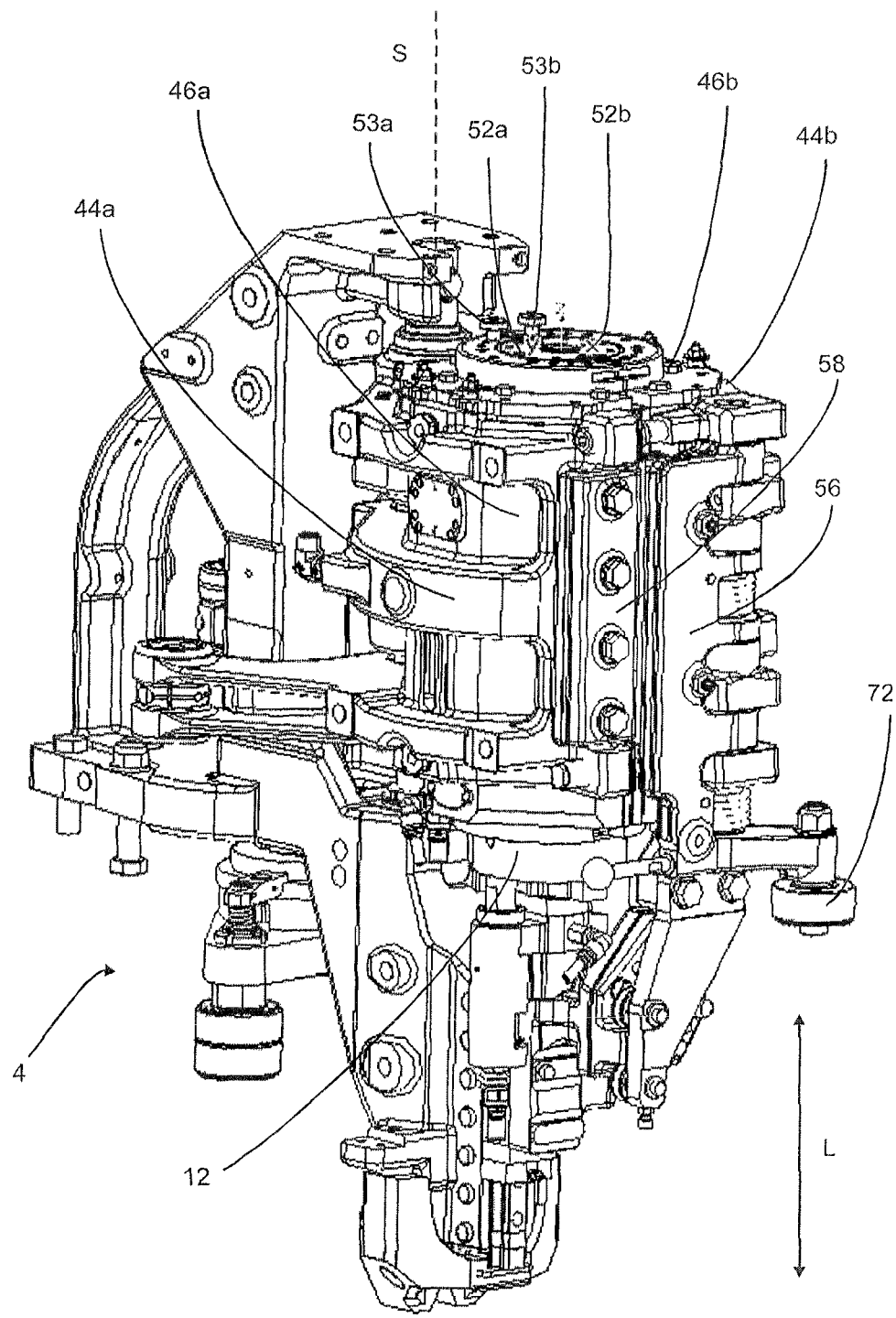
FIG. 1 shows a representation of a transforming device.

FIG. 1 shows a transforming station 4 of a transforming device according to the invention (not shown in its entirety) in a closed state. In this case this transforming station 1 has a first blow mould support part 44a as well as a second blow mould support part 44b. These two parts can be pivoted apart with respect to a pivot axis S which extends vertically here in order thus to be able to insert a plastic parison into a blow mould. Blow mould support shells 46a and 46b are arranged on these two blow mould support parts 44a, 44b. In this case these blow mould support shells can be fastened by means of a quick-fastening mechanism. This quick-fastening mechanism can likewise be actuated automatically.

In each case blow mould support parts 46a, 46b are in turn arranged on the blow mould support shells 52a and 52b. The reference signs 53a and 53b designate projections or gripping elements on which the blow moulds can be gripped and raised by an automatic changing device, such as a robot.

The reference signs 56 and 58 relate to two latching elements which serve for latching the blow mould. In this case a latching element 58 is arranged on the blow mould support part 44a, and the other latching element which can swivel with respect to a vertical axis is arranged on the blow mould support part 44b. Open and closing of this latching mechanism can be achieved by means of a cam roller 72.

The reference sign 12 designates a support on which the blow mould is arranged. This support can be raised and lowered—in particular when the apparatus is in operation—by means of a drive, such as for example a motor drive or also a hydraulic or pneumatic drive (in particular for closing and opening the blow mould).

Figure 2:
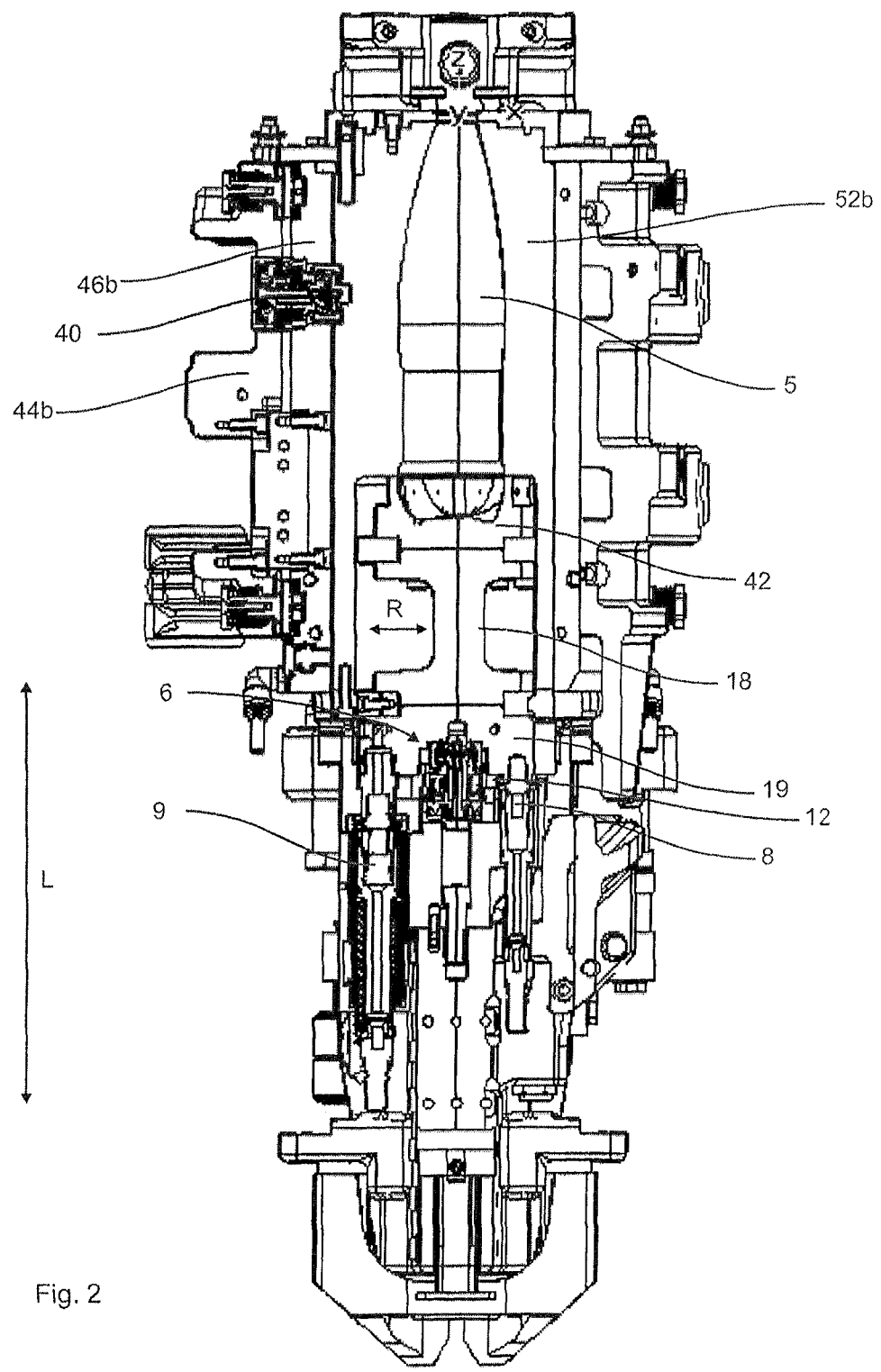
FIG. 2 shows a sectional representation of a transforming device.

FIG. 2 shows a sectional representation of the transforming station 4. This again shows the blow mould part 52b which is disposed on a blow mould support shell 46b as well as a blow mould support 44b. The reference sign 40 designates the fastening mechanism by means of which the blow mould support shell part is arranged on the blow mould support part 46b. In the cavity 5 a plastic parison can be expanded by application of compressed air to form the plastic container. For this purpose, as mentioned above, compressed air is applied to the mouth of the plastic parison.

The reference sign 42 designates a base part of the blow mould, which likewise delimits the cavity 5. This base part 42 is arranged on an intermediate support 18 which also serves for adaptation to different container types. The intermediate support 18 in turn is fastened to a fastening part 19 and this in turn is fastened on the support part 12 by means of the fastening mechanism according to the invention.

The reference signs 8 and 9 schematically designate connectors which serve for delivery of a cooling medium. Inside the fastening part 19 the corresponding fluid channels (not shown) extend initially radially inwards, then likewise in a vertical direction through the intermediate support 18 and in this way enter the base part 42 in order to control the temperature thereof. Therefore the base part 42 preferably also has temperature control medium channels (not shown).

Figure 3:
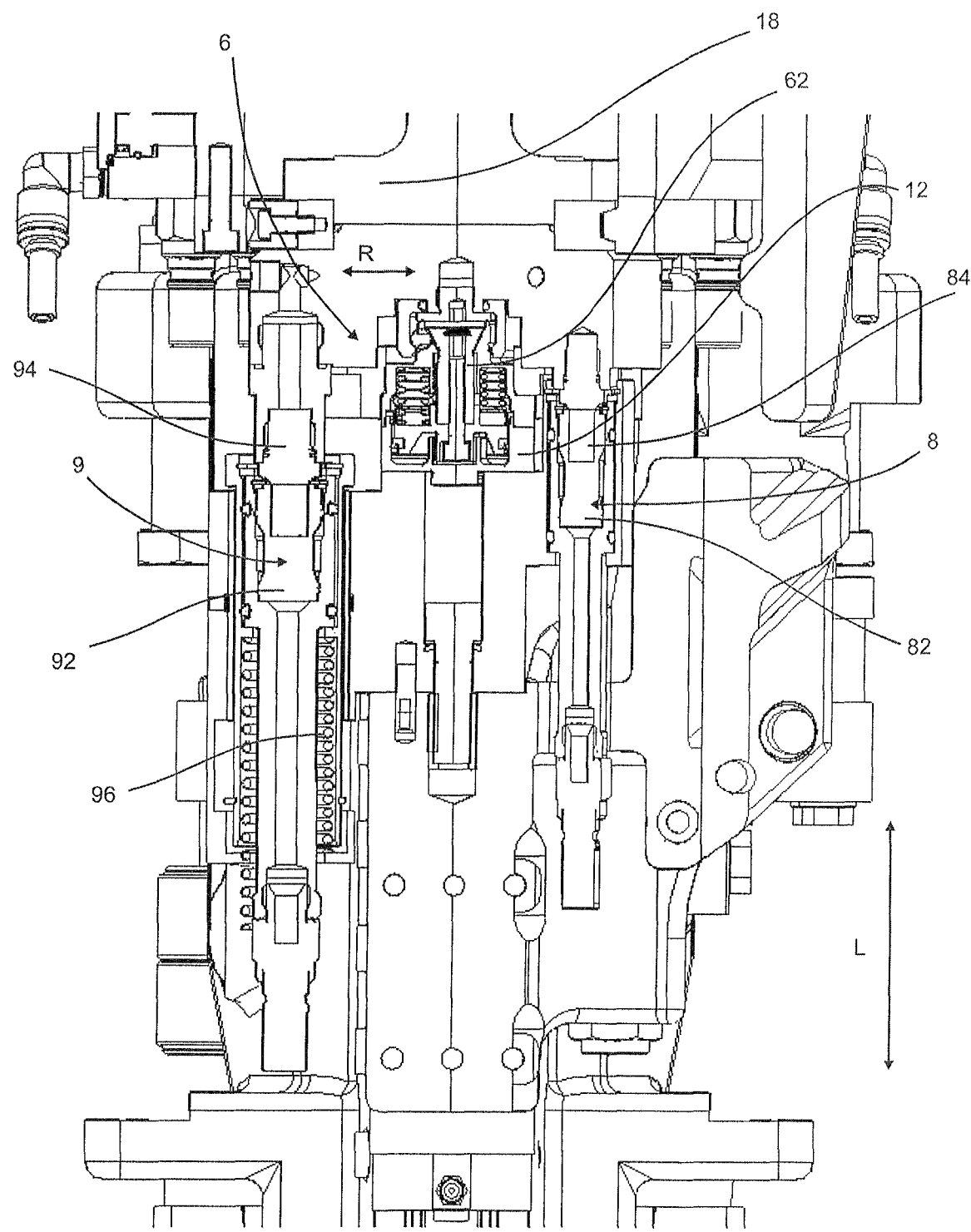
FIG. 3 shows a representation of a detail of the transforming device shown in FIG. 2.

FIG. 3 shows a representation of a detail of the apparatus shown in FIG. 2. In this case the reference sign 6 relates overall to the fastening mechanism. This fastening mechanism has a release element 62 which is movable in the vertical direction or in the longitudinal direction L. Also the removal of the blow mould takes place in this direction. Due to this movement in the same direction the connectors 8 or the connecting elements 82 and 84 or 92 and 94 thereof are separated from one another. The release element or actuating element can be raised by the application of compressed air, as is explained in greater detail below, in order to release the locking between the support 12 and the fastening part 19 and thus also the locking with the base part of the blow moulding device. In this case the fastening part 19 can be constructed as a disc-like body which for example is screwed on the intermediate support. This fastening part is removed together with the base part 42 and the intermediate support 18 when the base part 42 is changed. The reference sign R designates a direction perpendicular to the longitudinal direction L. In this direction for example the side parts can be removed from their respective supports.

In FIG. 3 the reference sign 96 relates to a spring element which biases the connecting element 92 upwards. In this way a chronologically staggered release of the two connectors 8, 9 can be achieved.

Figure 4:
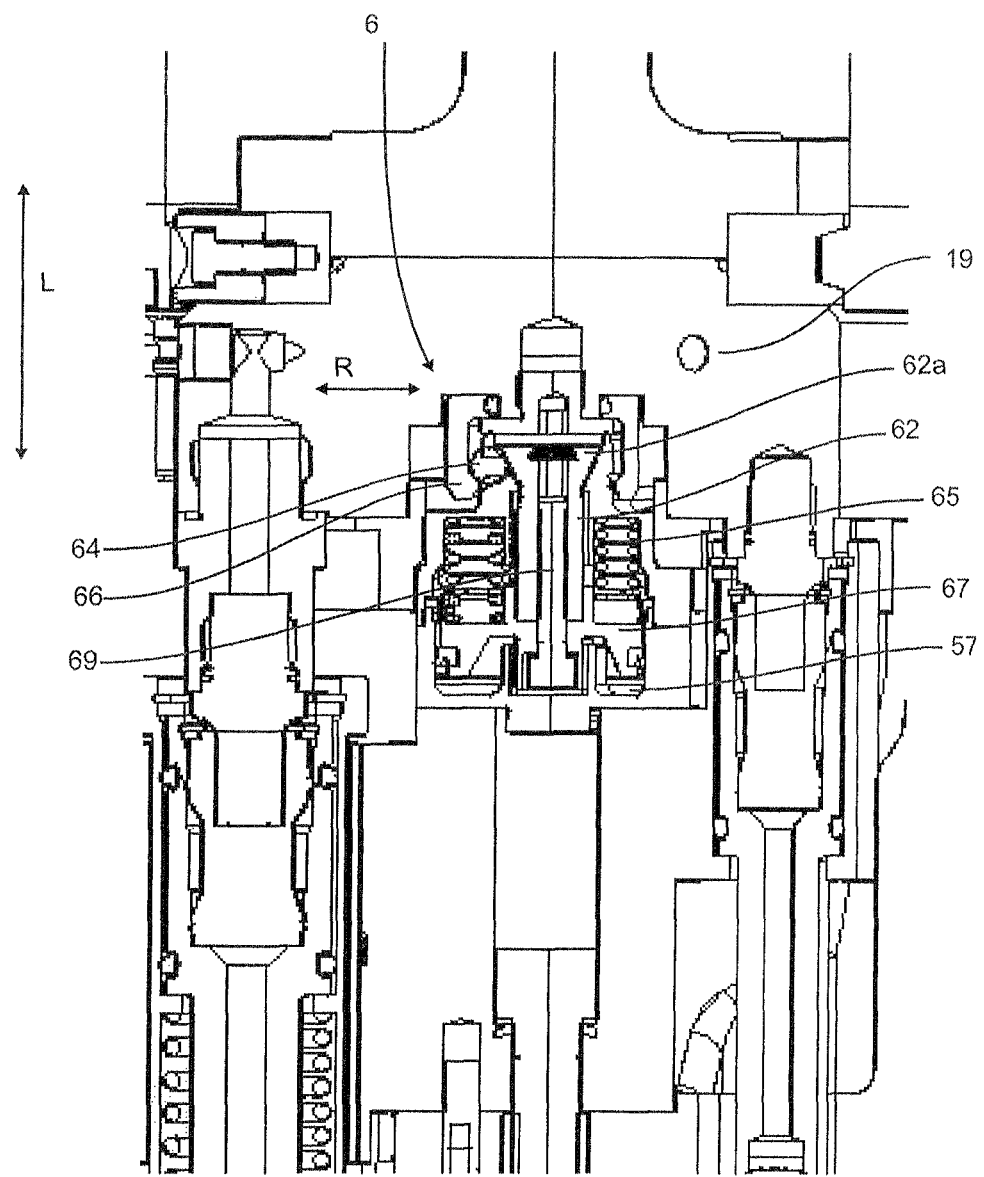
FIG. 4 shows a further representation of a detail of the transforming device shown in FIG. 2.
Figure 5:
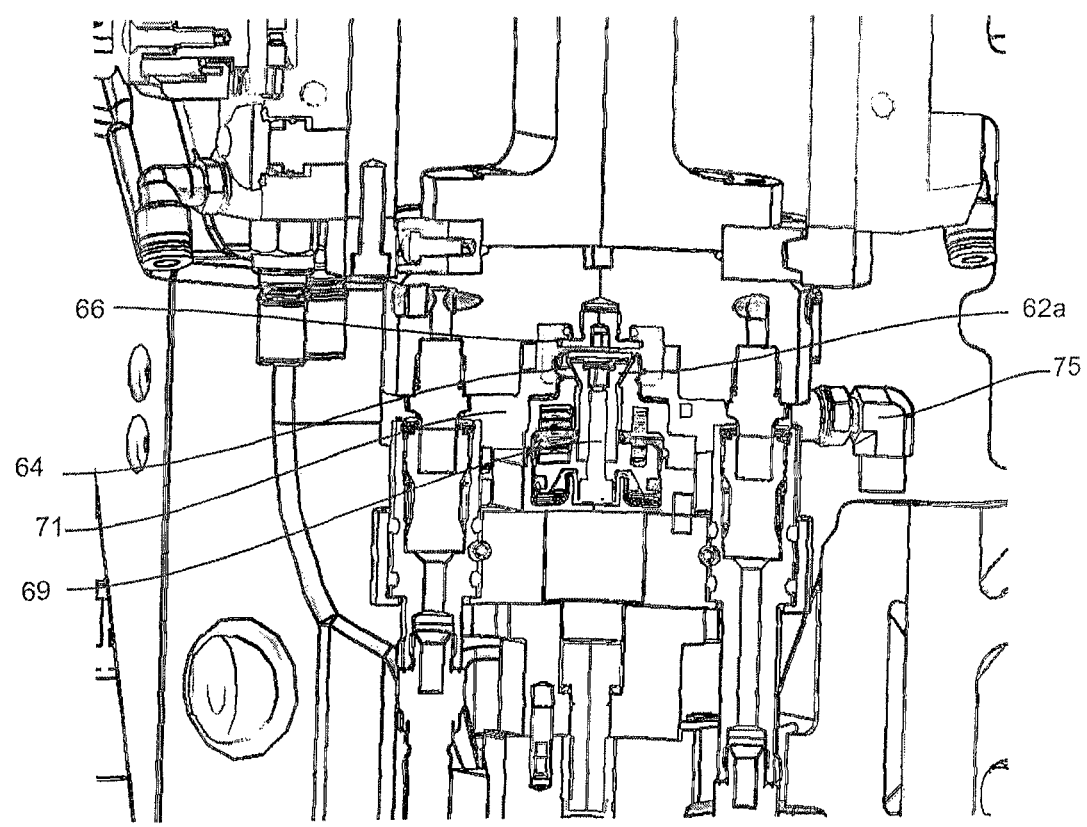
FIG. 5 shows a further representation of a detail of the transforming device shown in FIG. 2.

The fastening mechanism shown in greater detail in FIGS. 3 to 5 can also be used for fastening the side parts on the supports thereof, i.e. in particular the blow mould support shells. In this case, however, the fastening mechanisms 6 shown in each case are disposed in a position which is rotated substantially by 90° with respect to the position shown.

In FIG. 4 the mode of functioning of the fastening mechanism 6 is illustrated in greater detail. In the normal operational state the release element 62 is pressed downwards by a spring element 65. In this way the locking element 64 is pressed outwards by the inclined surface 62a and in this way engages in the fastening element 66. A separation between the element 72 and the support 12 can be prevented by this engagement. If compressed air is now applied to the receiving chamber 67, the actuating element 62 will move upwards and in this way the locking element 64 will retract again and therefore will no longer be in engagement with the fastening element 66. In this position the fastening part 19 and thus also the base part here can be lifted off upwards in the direction L. Simultaneously the connectors are also separated in this way, albeit with a time delay. The reference sign 69 relates to a guiding device which serves for guiding the release element 62. This guiding device 69 can engage in a hole in the release element 62, so that the release element 62 can slide relative to the guiding device 69, but in this case is guided by this guiding device 69. Thus the locking element is movable in the direction R shown in FIG. 4.

FIG. 5 shows a further representation of a detail of the fastening mechanism. This again shows the inclined surface 62a, which presses the locking element 64 radially outwards depending upon the position of the actuating element or release element. The reference sign 75 designates a connection for delivery of compressed air. This connection is in flow connection with the receiving chamber 57 shown in FIG. 4, so that release of the fastening mechanism 6 can be achieved by the application of compressed air. However, in a normal state the base part is locked on the support 12 by the spring element 65.

The applicant reserves the right to claim all the features disclosed in the application documents as essential to the invention in so far as they are individually or in combination novel over the prior art.

LIST OF REFERENCE SIGNS

L longitudinal direction
R direction different from L
4 transforming station
5 cavity
6 fastening mechanism
8 connector
9 connector
12 support part
18 intermediate support
19 fastening part
40 fastening mechanism
42 base part
44a first blow mould support part
44b second blow mould support part
46a, 46b blow mould support shell
52a,b blow mould side part
53a,b projection or gripping element
56 latching element
57 receiving chamber
58 latching element
62 release element
62a inclined surface
64 locking element
65 spring element
66 fastening element
69 guiding device
72 cam roller
75 connection
82,84 connecting element
92,94 connecting element
96 spring element

The invention claimed is:

1. An apparatus for transforming plastic parisons into plastic containers, said apparatus having at least one transforming station which has a blow mould within which the plastic parisons can be expanded by application of a gaseous medium, wherein the blow mould has a base part which is releasably arranged on a support, and having a fastening mechanism for fastening the base part to the support, wherein the transforming station has at least one first connector for supplying a flowable temperature control medium to the transforming station, wherein supply of the temperature control medium via the connector can be disconnected by removal of the base part from the support, wherein the fastening mechanism has a release element which is movable in a predetermined straight direction (L), and by a displacement of the release element into a first predetermined position, wherein the fastening of the base part on the support is releasable and by a displacement of the release element into a second predetermined position wherein the base part can be fastened on the support, said apparatus further comprising at least one robot device which robot device is configured to automatically carry out a change of the base part, and wherein the actuation of the fastening mechanism for the base part is coupled to the actuation of a fastening mechanism for at least one side part of the blow mould, wherein the fastening mechanism of the side part is rotated substantially by 90° relative to the fastening mechanism of the base part.

2. An apparatus for transforming plastic parisons into plastic containers with at least one transforming station which has a blow mould within which the plastic parisons can be expanded by application of a gaseous medium, wherein the blow mould has at least one side part which is releasable arranged on a support and a fastening mechanism for fastening the side part to the support, wherein the fastening mechanism has a release element which is movable in a predetermined straight direction (L), wherein by a displacement of this release element into a first predetermined position the fastening of the side part on the support is releasable, and wherein by a displacement of the release element into a second predetermined position the side part can be fastened on the support, said apparatus further comprising at least one robot device configured to automatically carry out a change of the side part, and wherein the side parts comprise projections or gripping elements on which the side parts can be gripped and raised by the robot device.

3. The apparatus according to claim 1, wherein after release of the fastening mechanism the base part is configured to be removed by a movement in a straight direction (L).

4. The apparatus according to claim 1, wherein the release element is configured to be actuated and/or moved automatically.

5. The apparatus according to claim 4, wherein the release element is configured to be actuated by a flow medium or by a magnetic force.

6. The apparatus according to claim 1, wherein the release element is not accessible for a user without the fastening mechanism being released and the blow mould part being removed.

7. The apparatus according to claim 1, wherein the base part is gripped by the robot device and, after release of the fastening mechanism, is removed from the support.

8. The apparatus according to claim 2, wherein the side part is gripped by the robot device and, after release of the fastening mechanism, is removed from the support.

9. The apparatus according to claim 1, wherein the fastening mechanism is arranged in a radially inner region of the support and a fastening element and is not accessible from the exterior.

10. The apparatus according to claim 1, wherein the fastening mechanism has a receiving chamber which is configured to receive a gaseous medium, wherein a pneumatic medium is applied to the receiving chamber in order thus to move the release element.

11. The apparatus according to claim 10, wherein a piston which is arranged inside the receiving chamber and which is applied which compressed air is arranged on the release element.

12. The apparatus according to claim 1, wherein the blow mould is removed in its entirety from the transforming station.

13. A method for operating an apparatus for transforming plastic parisons into plastic containers, wherein in a working operation the plastic parisons are expanded by application of a flowable medium within a blow moulding device, and a flowable temperature control medium flows through at least one base part and a side part of the blow moulding device, wherein the temperature control medium is supplied to the base part and the side part by a connector, and the base part and the side part is in each case fastened by a fastening mechanism on a support, wherein the fastening mechanism has a release element which is movable in a predetermined straight direction (L), and by a displacement of release element into a first predetermined position the fastening of the base part and of the side part on the support is released, and by a displacement of the release element into a second predetermined position the base part and the side part can be fastened on the support, and wherein at least one robot device is provided which robot device is configured to automatically carry out a change of the base part and/or the side part, wherein actuation of the fastening mechanism for the base part is coupled to actuation of the fastening mechanism for at least one side part.

14. The method according to claim 13, wherein the temperature control medium is supplied to the base part by a first connector and drawn off from the base part by a second connector, and when the base part is installed on or removed from the support connecting elements of the first connector, and connecting elements of the second connector are connected to one another or released from one another with a time delay.

15. The apparatus according to claim 1, wherein the fastening mechanism is constructed between the blow mould support and the blow mould support shell or between the blow mould support and the side part.

16. The apparatus according to claim 2, wherein the fastening mechanism is constructed between the blow mould support and the blow mould support shell or between the blow mould support and the side part.

17. The apparatus according to claim 13, wherein the fastening mechanism is constructed between the blow mould support and the blow mould support shell or between the blow mould support and the side part.

18. The apparatus according to claim 1, wherein the base part is arranged by at least one intermediate support on the support, wherein the intermediate support functions as a spacer.

19. The apparatus according to claim 13, wherein the base part is arranged by at least one intermediate support on the support, wherein the intermediate support functions as a spacer.

20. The apparatus according to claim 2, wherein the apparatus has the fastening mechanisms both for the side part or the side parts of the blow moulding device and also for a base part.

21. The apparatus according to claim 1, wherein the coupling takes place pneumatically, hydraulically or by an electronic control.

22. The apparatus according to claim 13, wherein the coupling takes place pneumatically, hydraulically or by an electronic control.

23. The apparatus according to claim 1, wherein at least one space to which a gaseous medium can be applied is constructed between the blow mould support parts and the blow moulds parts.

24. The apparatus according to claim 2, wherein at least one space to which a gaseous medium can be applied is constructed between the blow mould support parts and the blow moulds parts.

25. The apparatus according to claim 13, wherein at least one space to which a gaseous medium can be applied is constructed between the blow mould support parts and the blow moulds parts.

* * * * *